(12) United States Patent
Drouin et al.

(10) Patent No.: US 6,226,142 B1
(45) Date of Patent: May 1, 2001

(54) BURST PATTERN FOR DETECTING THE POSITION OF A READ/WRITE HEAD RELATIVE TO A MAGNETIC DISK

(75) Inventors: David Drouin, Milpitas; Vien N Nguyen; Stephen R. Jackson, both of San Jose, all of CA (US)

(73) Assignee: Castlewood Systems, Inc., Milpitas, CA (US)

( * ) Notice: Subject to any disclaimer, the term of this patent is extended or adjusted under 35 U.S.C. 154(b) by 0 days.

(21) Appl. No.: 09/075,699

(22) Filed: May 11, 1998

Related U.S. Application Data
(60) Provisional application No. 60/065,552, filed on Nov. 14, 1997.

(51) Int. Cl.[7] .................................................. G11B 5/596
(52) U.S. Cl. .......................... 360/77.08; 360/48; 360/49; 360/78.14
(58) Field of Search .................................. 360/48, 77.08, 360/78.14, 75, 98.01, 133, 77.02, 78.04, 49

(56) References Cited
U.S. PATENT DOCUMENTS

| | | |
|---|---|---|
| 5,235,478 | 8/1993 | Hoshimi et al. . |
| 5,257,149 | 10/1993 | Meyer . |
| 5,398,141 | 3/1995 | Tannert . |
| 5,523,903 | 6/1996 | Hetzler et al. . |
| 5,535,072 | 7/1996 | Witt et al. . |
| 5,559,648 | 9/1996 | Hunter et al. . |
| 5,570,244 | 10/1996 | Wiselogel . |
| 5,579,189 | 11/1996 | Morehouse et al. . |
| 5,587,850 | 12/1996 | Ton-that . |
| 5,615,063 | 3/1997 | Kuroki et al. . |
| 5,636,075 | 6/1997 | Nishimura et al. . |

*Primary Examiner*—Alan T. Faber
(74) *Attorney, Agent, or Firm*—Townsend and Townsend and Crew LLP

(57) ABSTRACT

A technique for formatting a magnetic disk for a removable magnetic cartridge includes the steps of providing the magnetic disk having a top surface and a bottom surface, writing a first servo track onto the top surface, the first servo track having a portion including a first gray code, a first position burst, and a second position burst, writing a second servo track onto the top surface adjacent to the first servo track, the second servo track having a portion including a second gray code, the second position burst, and a third position burst, and writing a third servo track onto the top surface adjacent to the second servo track, the third servo track having a portion including the second gray code, the third position burst and a fourth position burst, wherein a first data track comprises the first servo track, the second servo track and the third servo track.

24 Claims, 13 Drawing Sheets

BURST PATTERN FOR DETECTING THE POSITION OF A READ/WRITE HEAD RELATIVE TO A MAGNETIC DISK

This application claims benefit of Provisional Application No. 60/065,552, filed Nov. 14, 1997.

BACKGROUND OF THE INVENTION

The present invention generally relates to removable storage devices for electronic information. More particular, the present invention relates to enhancing data storage capacity by improving the accuracy of data storage and retrieval.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "lifelike" sound from the high quality stereo or surround sound system. Accordingly, the clash between Luke Skywalker and Darth Vader can now be seen as well as heard in surround sound on your own home entertainment center. In the mid-1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, and quick access capabilities.

The present invention relates to storage media that utilizes magneto-resistive head (MR read/write head) technology. One benefit to MR head technology is the reduction in amount of data overhead from removing data ID fields from data sectors on the disk. Magnetic disks without such ID fields are termed "headerless ID" magnetic disks.

In order to locate MR heads over particular locations on a magnetic disk, servo wedge bursts are provided that include positional data such as positional burst patterns, logical cylinder numbers (track number or servo track number), sector numbers, and other header data. Typical logical cylinder numbers, sector numbers, and the like are the same width as typical data tracks. Further, typical positional burst patterns include a quadrature pattern (A,B, C, and D), each which are from two-thirds to the same width as typical data tracks. Based upon the servo track number, sector number, intensity of signals of A, B, C, and D, and the like, most positions of the MR head relative to the magnetic disk are typically determined.

Drawbacks to these current approaches include that they have limited upward compatibility with higher resolution (smaller) MR read/write heads. Since current physical sizes of the positional burst patterns, servo track number, etc. are large compared to higher resolution MR read/write heads, locating MR head relative to current magnetic disks is more difficult.

What is required is a method and apparatus for increasing the positional accuracy of MR heads on a magnetic disk.

SUMMARY OF THE INVENTION

According to the present invention, a technique including methods and a device for increasing the positional accuracy of MR heads on a magnetic disk is disclosed. In an exemplary embodiment, the present invention provides a methods and apparatus for an improved burst pattern.

According to an embodiment of the present invention, a removable magnetic cartridge providing enhanced data storage capacity includes a rigid casing and a magnetic disk disposed within the rigid casing. The magnetic disk includes a top surface for storage of data and a bottom surface for storage of data. The bottom surface includes a plurality of data tracks, at least one data track from the plurality of data tracks comprising a first servo track, a second servo track, and a third servo track, the first servo track having a portion including a first gray code, a first position burst, and a second position burst, the second servo track having a portion including a second gray code, the second position burst, and a third position burst, and the third servo track having a portion including the second gray code, the third position burst and a fourth position burst.

According to another embodiment of the present invention a method for formatting a magnetic disk for a removable magnetic cartridge includes the steps of: providing the magnetic disk having a top surface and a bottom surface, writing a first servo track onto the top surface, the first servo track having a portion including a first gray code, a first position burst, and a second position burst, and writing a second servo track onto the top surface adjacent to the first servo track, the second servo track having a portion including a second gray code, the second position burst, and a third position burst. The steps of writing a third servo track onto the top surface adjacent to the second servo track, the third servo track having a portion including the second gray code, the third position burst and a fourth position burst, wherein a first data track comprises the first servo track, the second servo track and the third servo track are also performed.

According to another embodiment, a computer system having a removable drive unit is disclosed, the removable drive unit including a magnetic disk including a first servo track having a portion including a first gray code, a first position burst, and a second position burst, a second servo track having a portion including a second gray code, the second position burst, and a third position burst, and a third servo track having a portion including the second gray code, the third position burst and a fourth position burst, and a sensor coupled to the magnetic disk for reading data values for the first gray code, for the second gray code, for the first position burst, for the second position burst, for the third position burst, and for the fourth position burst. A memory coupled to the sensor for storing the data values for the first gray code, for the second gray code, for the first position burst, for the second position burst, for the third position burst, and for the fourth position burst, and a processor coupled to the memory for determining a position of the sensor relative to the magnetic disk in response to the data values for the first position burst, for the second position burst, for the third position burst, and for the fourth position burst and for determining a position of the sensor relative to a data track on the magnetic disk in response to the data values for the first gray code and for the second gray code, and to the position of the sensor relative to the magnetic disk are also provided.

Numerous benefits are achieved by way of the present invention. For instance, the present invention increases the positional accuracy of MR heads relative to a magnetic disk. Depending upon the embodiment, the present invention provides at least one of these if not all of these benefits and others, which are further described throughout the present specification.

Further understanding of the nature and advantages of the invention may be realized by reference to the remaining portions of the specification and drawings.

DESCRIPTION OF SPECIFIC EMBODIMENTS

Figure 1:
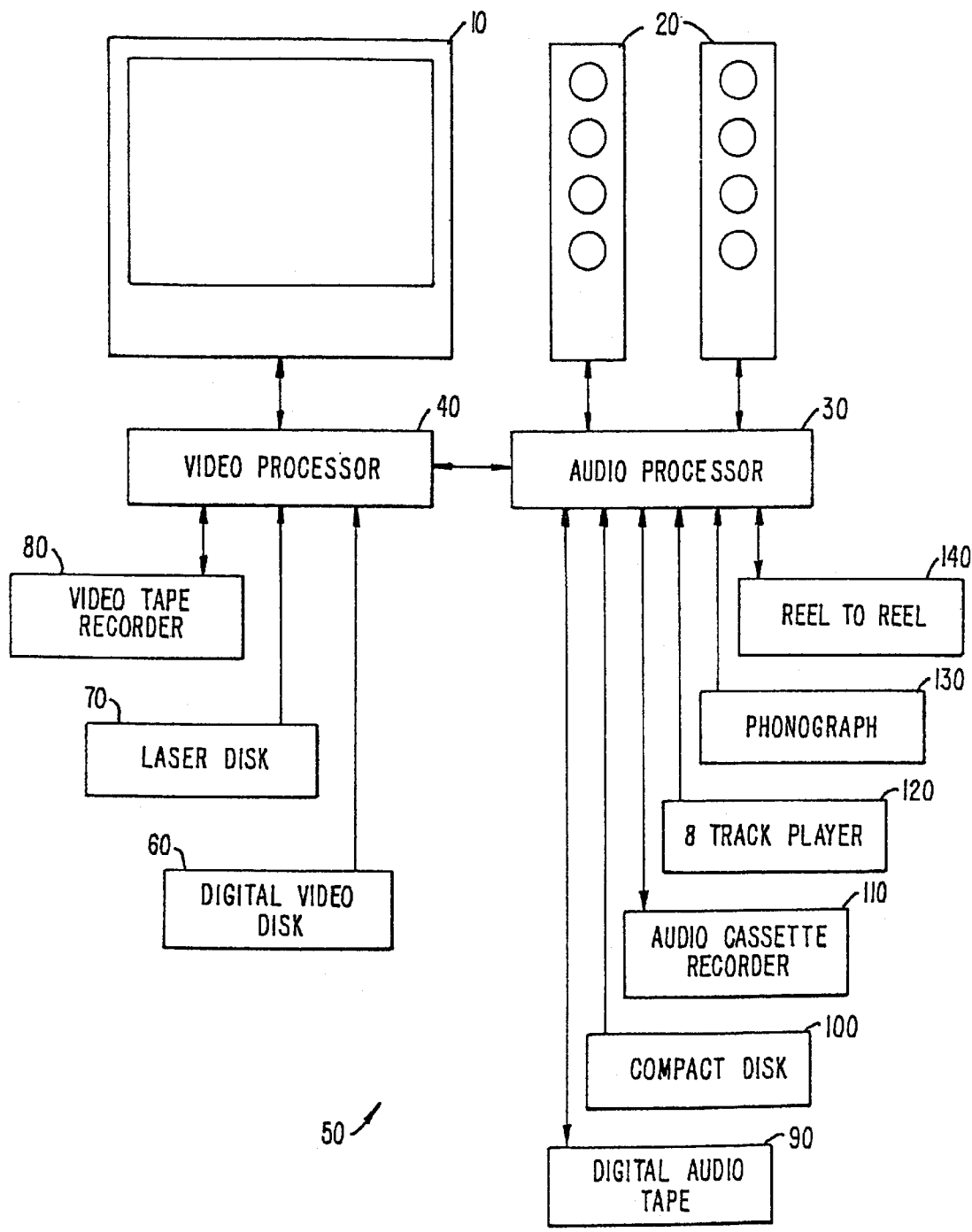
FIG. 1 illustrates a conventional audio and video configuration.
Figure 2:
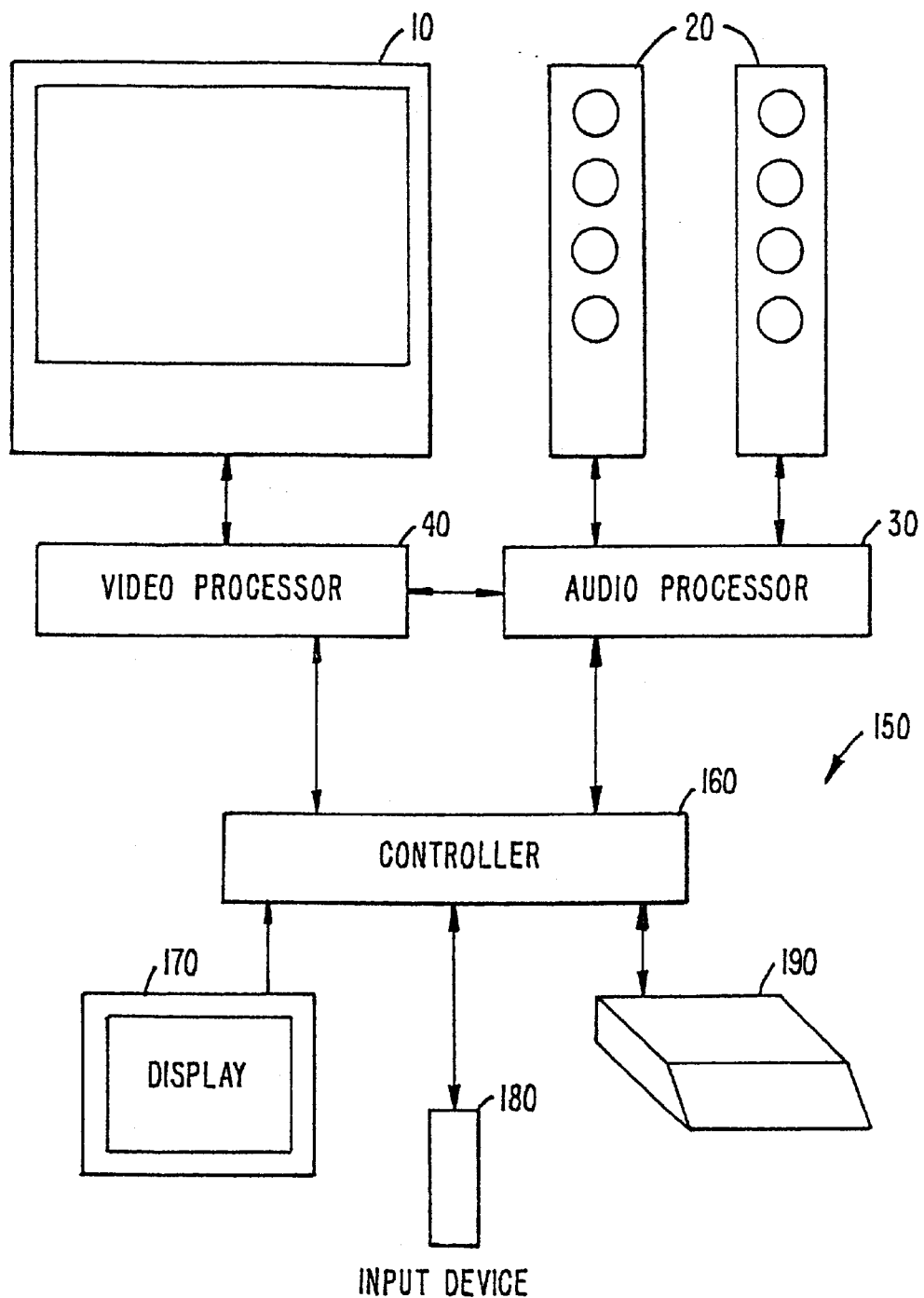
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
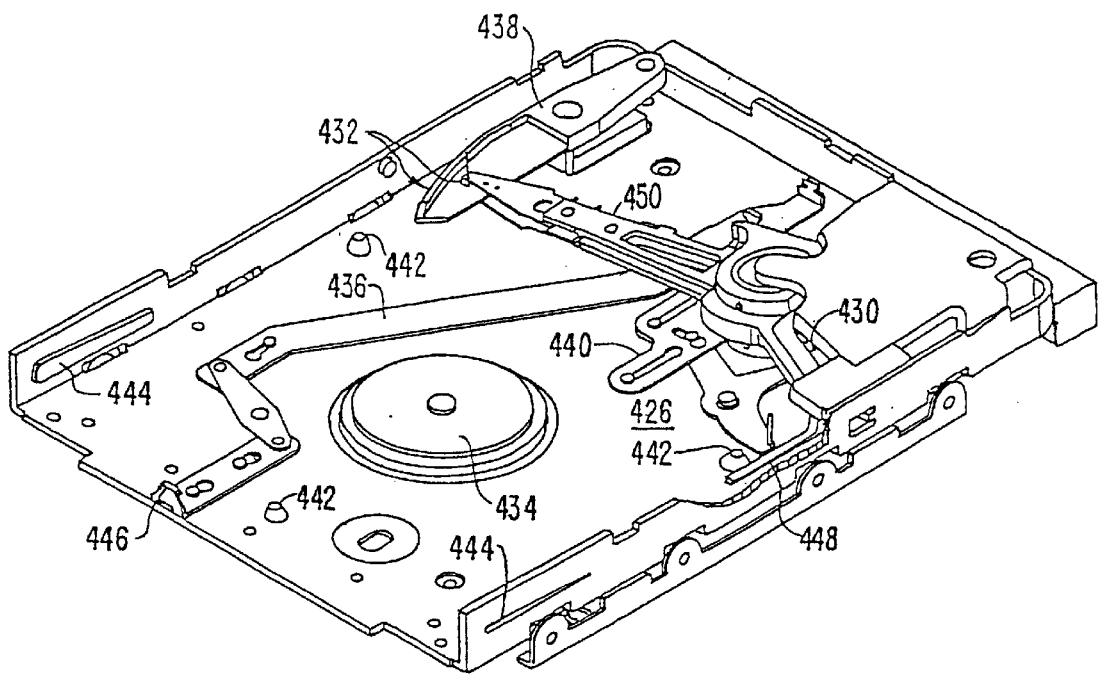
FIGS. 5A–5F illustrate simplified views and a storage unit for reading and/or writing from a removable media cartridge.
Figure 5B:
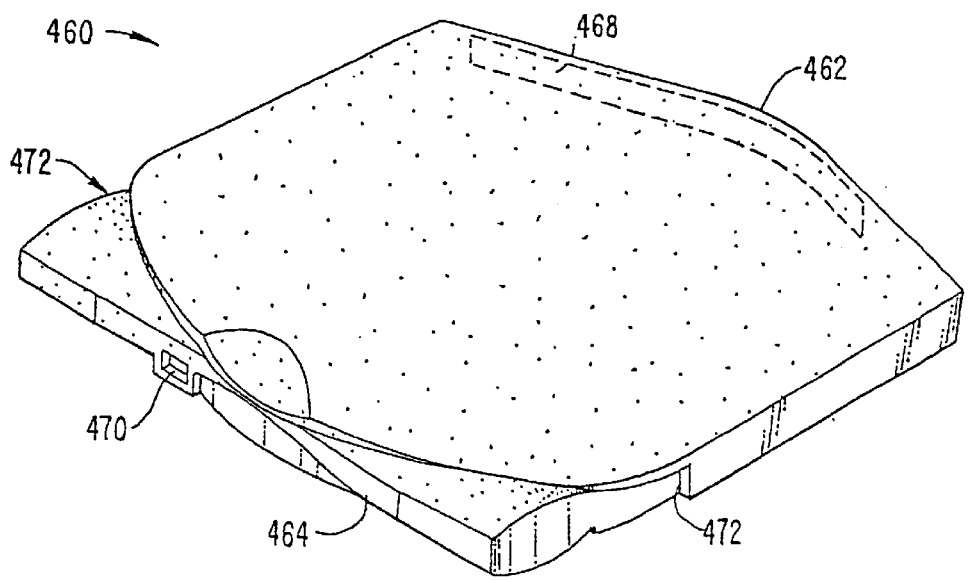
Figure 5C:
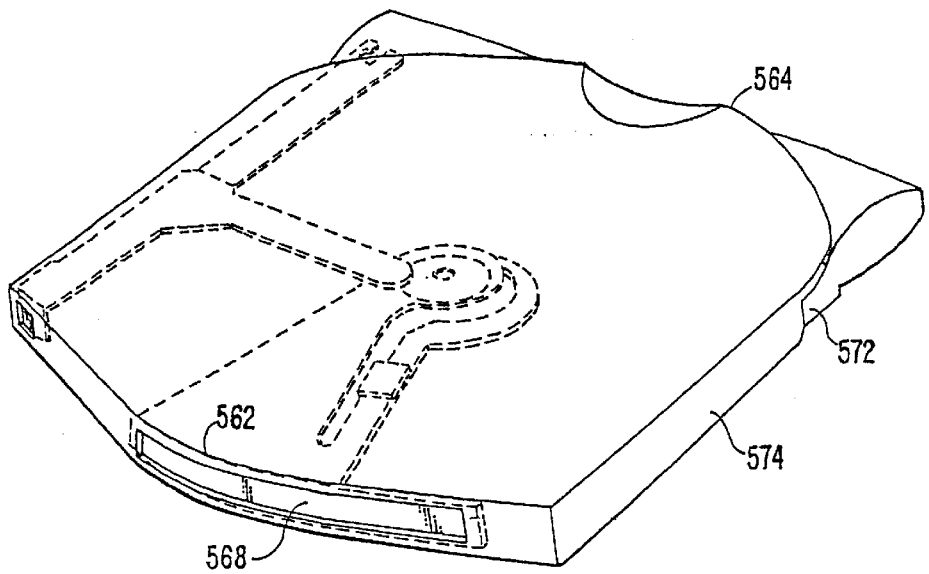

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII—2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
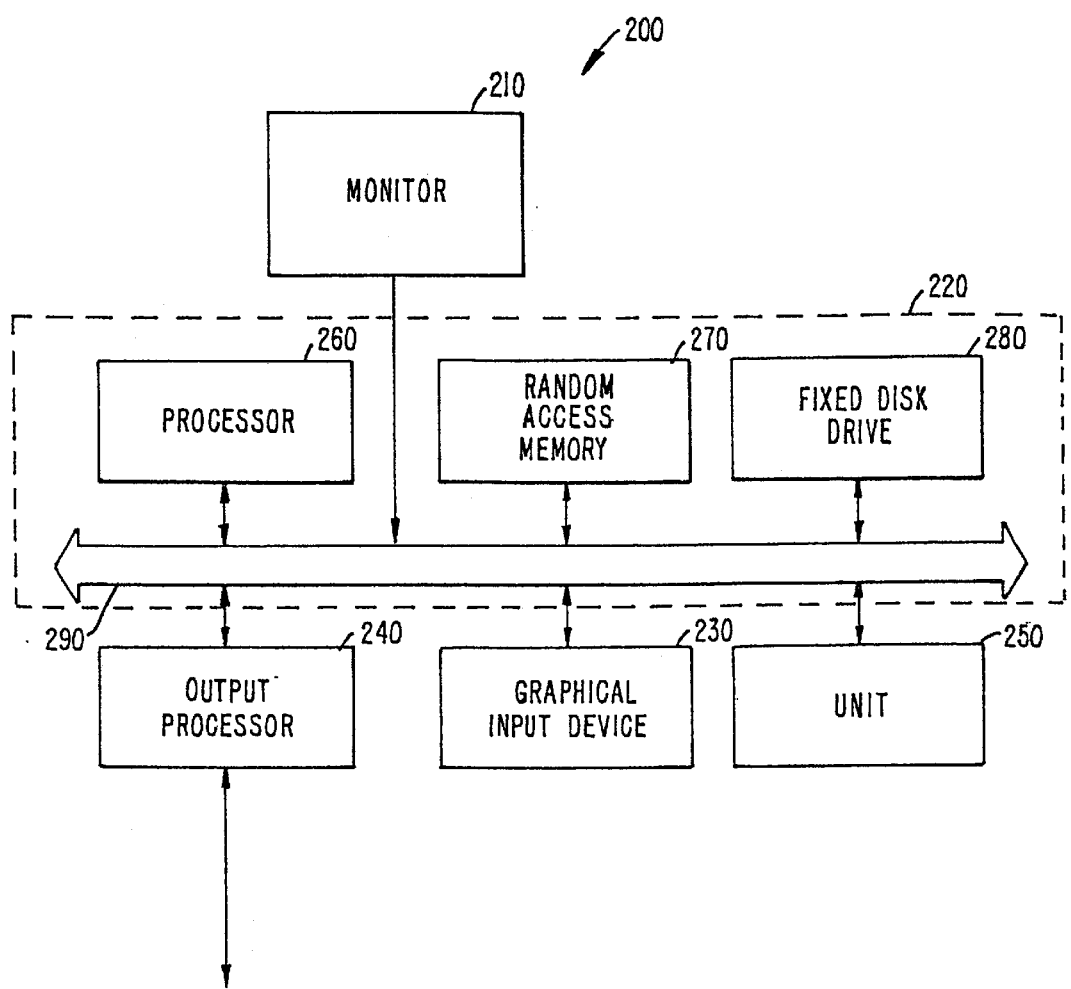
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows95™ operating system from Microsoft Corporation of Redmond, Wash. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

DETAILED DESCRIPTION

Figure 4A:
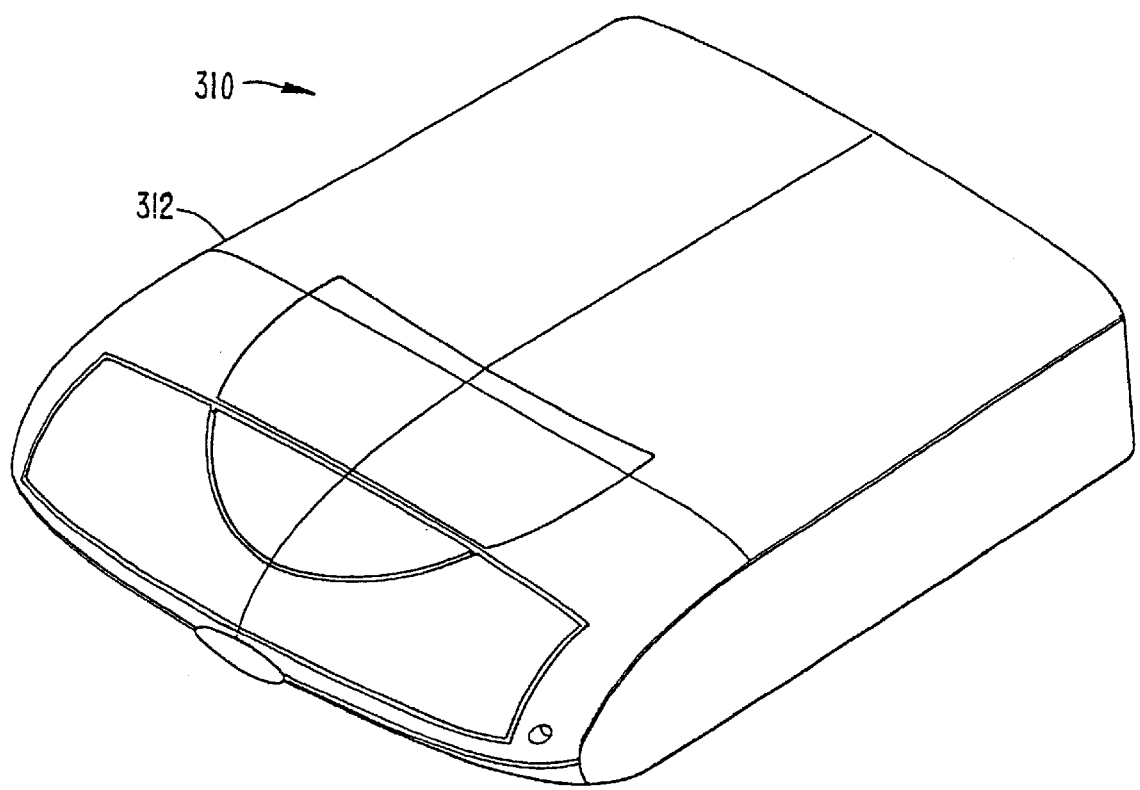
FIGS. 4A and 4B illustrate a storage unit according to an embodiment of the present invention.
Figure 4B:
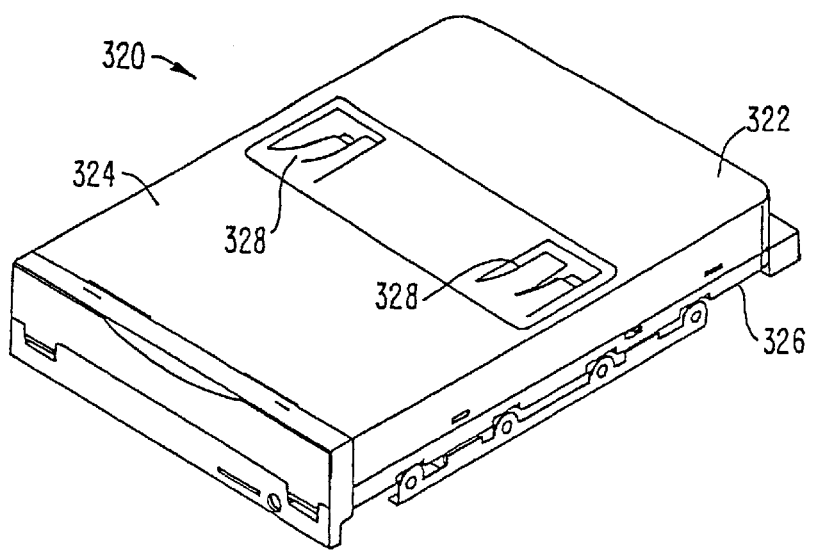

Referring now to FIGS. 4A and 4B, a storage unit according to the present invention can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A. In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
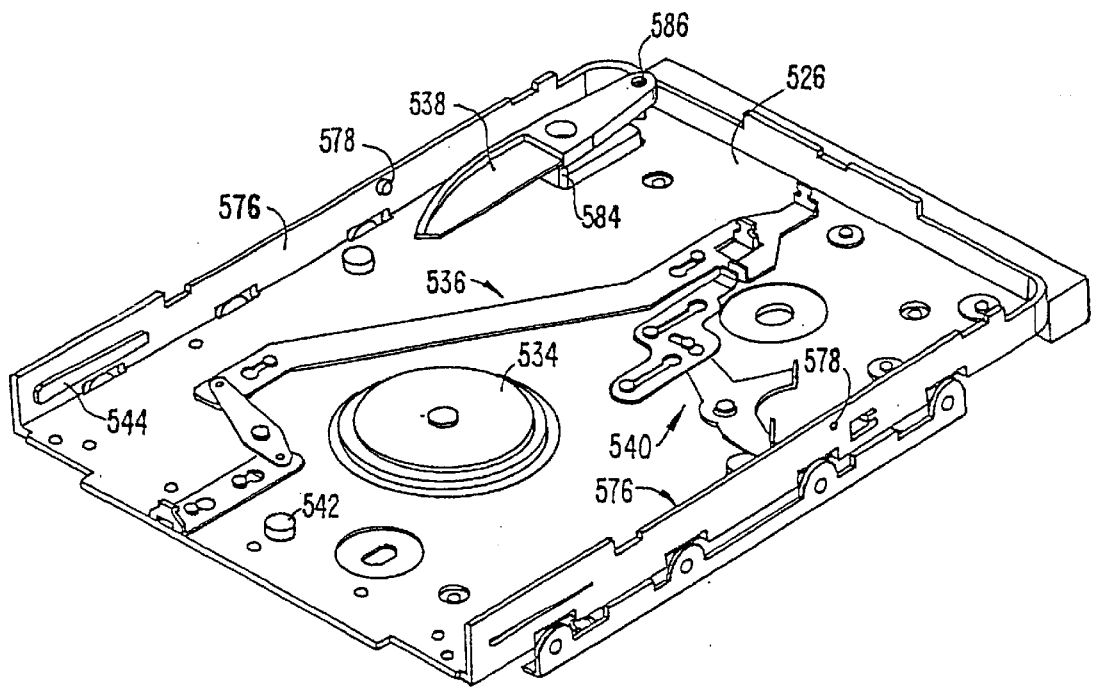
Figure 5E:
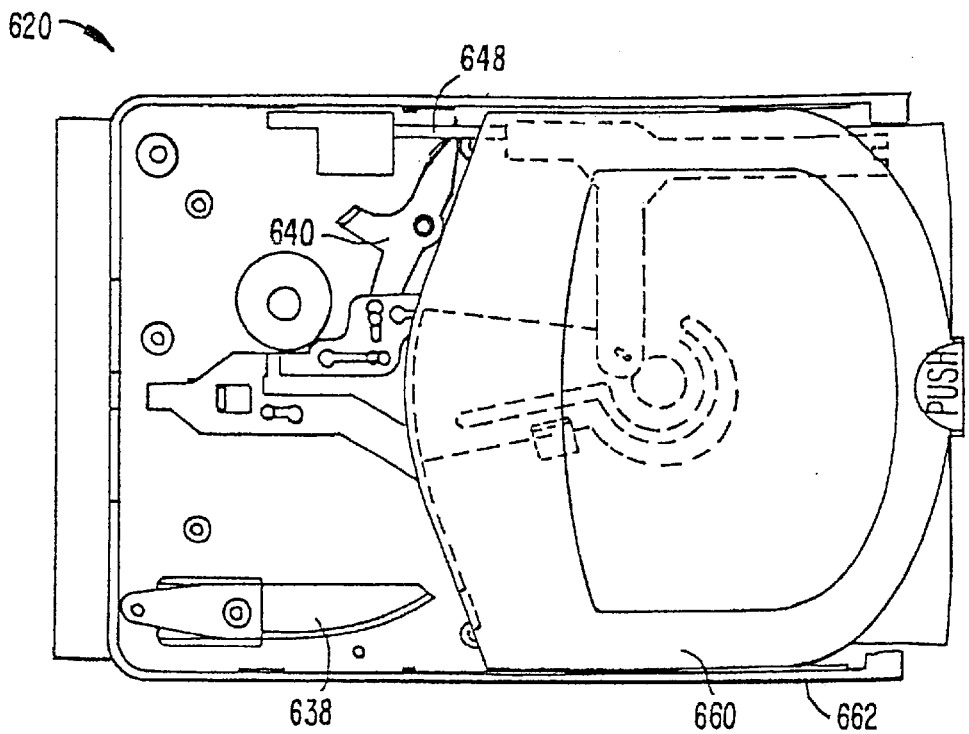

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
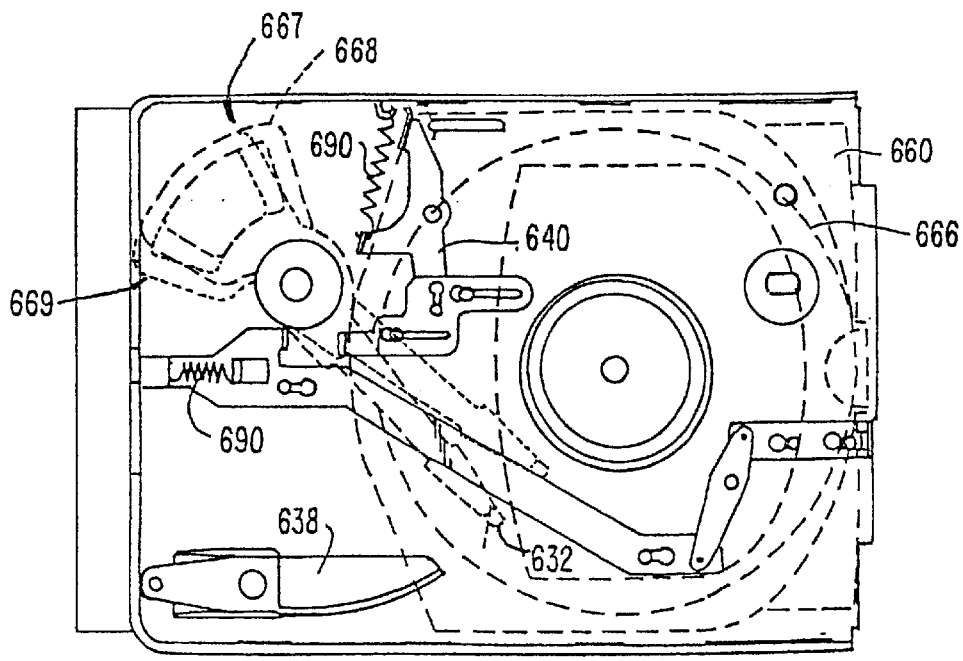

FIG. 5F also illustrates a typical first position 667 of VCM 668 and a typical second position 669 in response to different currents from a motor driver. As a result, read/write heads 632 are repositioned relative to disk 666 as shown.

Figure 6:
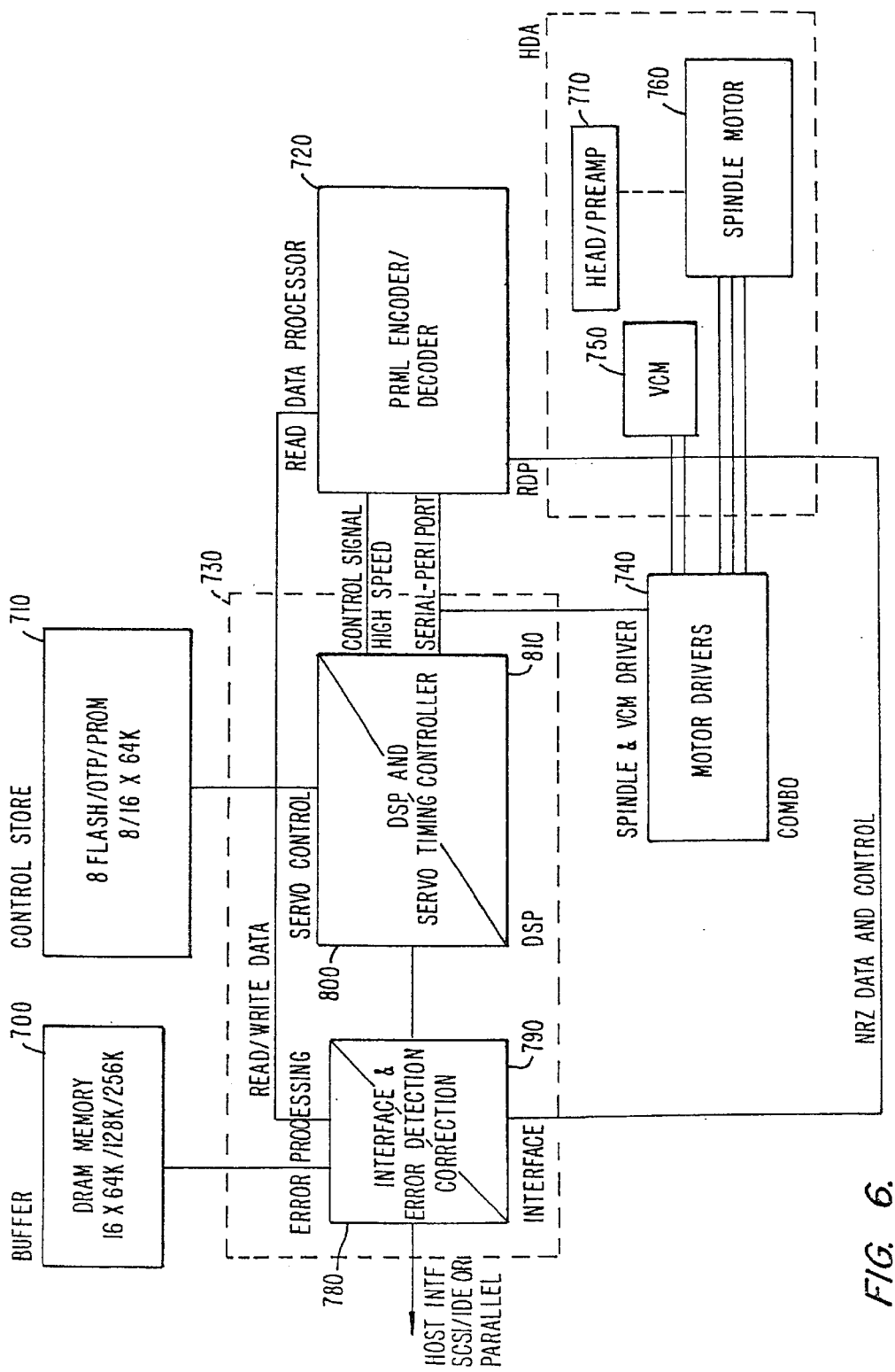
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits×64 K, 128 K, or 256 K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises a 8 to 16 bit×64 K memory array, preferably a flash RAM by Atmel. Control store 710 is coupled to DSP 800 and servo timing controller 810, and typically serves to store programs and other instructions for DSP 800 and servo timing controller 810. Preferably, control store 710 stores access information that enables retrial of the above information from the media and calibration data.

Read data processor 720 typically comprises a Partial Read/Maximum Likelihood (PRML) encoder/decoder. PRML read channel technology is well known, and read data processor 720 is typically embodied as a 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AK-8381 chip from Adaptec, Inc. Interface module 780 is coupled to error detection and correction module 790 for transferring data to and from the host system.

Error detection and correction module 790 is typically embodied as a AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as a AIC4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP 800.

Motor driver 740 is typically embodied as a L6260L Chip from SGS-Thomson. Motor driver 740 provides signals to voice coil motor 750 and to spindle motor 760 in order to control the reading and writing of data to the removable media.

Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic flux. VCM 750 also includes an actuator having a voice coil, and read/write heads. Read/write heads are typically positioned near the end of the actuator arm, as illustrated in FIG. 5A. The voice coil is typically electrically coupled to motor driver 740. VCM 750 is positioned relative to the magnetic disk in response to the amount of current flowing through the voice coil. FIG. 5F illustrates a typical first position 667 of VCM 668 and a typical second position 669 in response to different magnetic fluxes from motor driver 740. As a result, read/write heads 632 are repositioned relative to disk 666 as shown.

In a preferred embodiment of the present invention read/write heads are separate heads that utilize magneto resistive technology. In particular, the MR read/write heads. Typically a preamplifier circuit is coupled to the read/write heads.

In the preferred embodiment of the present embodiment the removable media cartridge is comprises as a removable magnetic disk. When reading or writing data upon the magnetic disk the read/write heads on the end of the actuator arm "fly" above the surface of the magnetic disk. Specifically, because the magnetic disk rotates at a high rate of speed, typically 5400 rpm, a negative pressure pulls the read/write heads towards the magnetic disk, until the read/write heads are typically 0.001 millimeters above the magnetic disk. At 2000 rpm, the negative pressure on the read/write heads drops to approximately half the force as at 5400 rpm.

Figure 7:
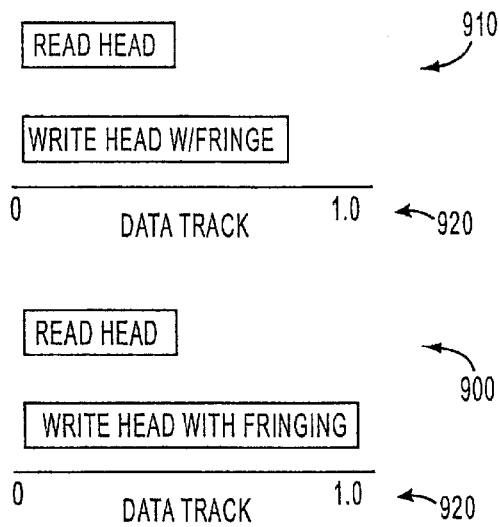
FIG. 7 illustrates embodiments of the present invention.

FIG. 7 illustrates embodiments of the present invention. FIG. 7 illustrates the size of present embodiments of MRs read and write heads 900 relative to the current data track width 920. FIG. 7 also illustrates the size of higher resolution MR read/write heads 910 relative to the current data track width 920.

Figure 8:
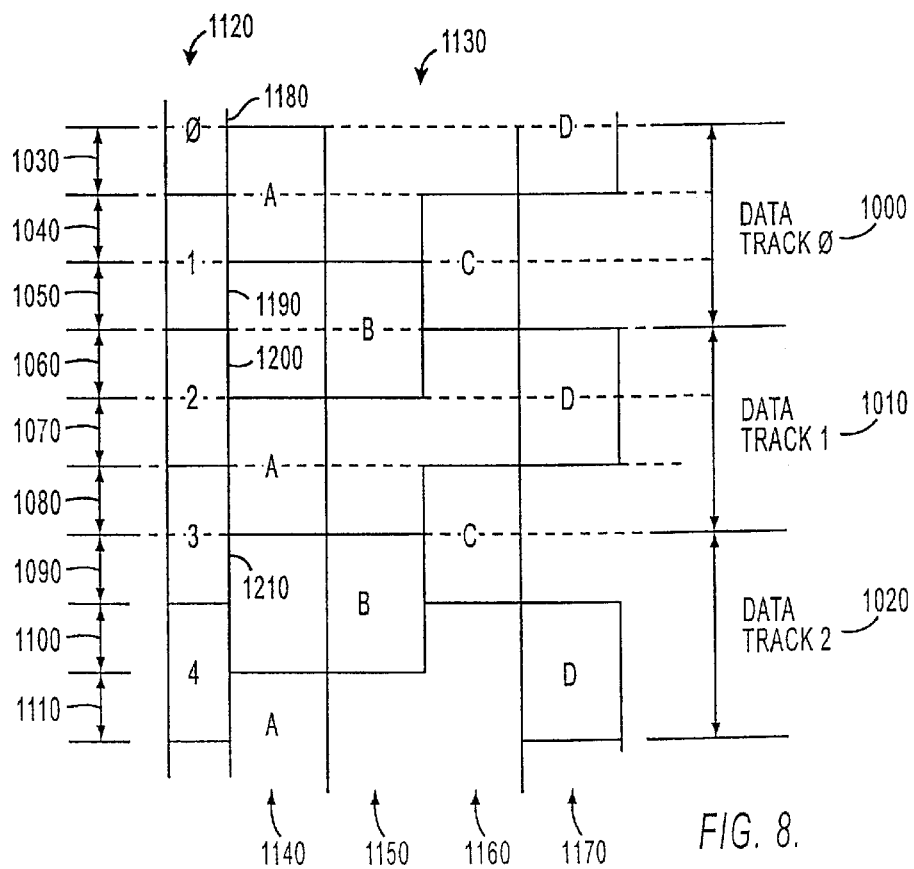
FIG. 8 illustrates an overview of a magnetic disk according to an embodiment of the present invention.

FIG. 8 illustrates an overview of a magnetic disk according to an embodiment of the present invention. FIG. 8 includes data tracks 1000, 1010, 1020 and servo tracks 1030–1110. Each servo track includes gray code bursts 1120 and position burst patterns 1130. Position burst patterns 1130 include A bursts 1140, B bursts 1150, C bursts 1160, and D bursts 1170, and gray code bursts 1120 include bursts 1180–1210. The layout, sizes, and duration of gray code burst 1120, position burst patterns 1130, and the like FIG. 8 are not necessarily to scale.

As illustrated in FIG. 8, each data track typically comprise three servo tracks, for example servo tracks 1030–1050 define data track 1000 and servo tracks 1060–1080 define data track 1010. More particularly, in FIG. 8, servo track 1030 includes the bottom of a 0th gray code burst 1180, the top of an A burst, and the bottom of a D burst; servo track 1040 includes the top of a 1st gray code burst 1190, the bottom of the A burst, and the top of the C burst; servo track 1050 includes the bottom of the 1st gray code burst 1190, the top of a B burst, and the bottom of the C burst; etc.

As illustrated in this embodiment, the width of gray code bursts 1120 are preferably two-thirds the width of the data track, further, the width of position burst patterns 1130 are preferably also two-thirds the width of the data tracks. Other arrangements in light of the above disclosed configuration are contemplated in alternative embodiments of the present invention.

Servo tracks 1030–1110, including gray code bursts 1120 and position burst patterns 1130, are typically written to the magnetic disk during manufacture of the magnetic disk.

Gray code bursts 1120 typically identify the location of the burst on the disk. In particular, gray code bursts 1120 typically identify a cylinder number and sector number (position on the track). In the present embodiment there are approximately 27,900 servo tracks per inch, 18,600 cylinders per inch, and 90 sectors per track. To represent the cylinder number and sector number within each gray code burst in this embodiment requires 21 bits of information (14 bits and 7 bits respectively).

One method to lessen the number of bits required for each gray code burst is to split the representation of the cylinder number and sector number among more than one gray code burst along the same track. For example, in one case pairs of gray code bursts are used, and each gray code burst includes 14 bits of information. For even numbered sectors, the 14 bit cylinder number is stored in the gray code burst, and for odd numbered sectors, a lower byte of the cylinder number is stored along with 6 of the most significant bits (MSB) of the sector number in the gray code burst. Other combinations and distributions of bits between gray code bursts within the same servo track are envisioned in alternative embodiments of the present invention, for example distribution of bits between three or more groups of gray code bursts.

In FIG. 8, Position burst patterns 1130 comprise conventional quadrature-valued position bursts: A bursts 1140, B bursts 1150, C. bursts 1160, and D bursts 1170 as shown. Any conventional values for position bursts 1130 can be used for embodiments of the present invention.

In the present embodiment, position burst patterns 1130 are preferably written to the magnetic disk at the same predetermined potential. Using MR read head 900 or 910 as illustrated in FIG. 7, the MR read head 910 reads data that identifies the type of burst (A, B, C, or D), reads the intensity of the respective bursts, and reads the gray code information. Based upon such data, the position of the MR read head is determined.

Figure 9:
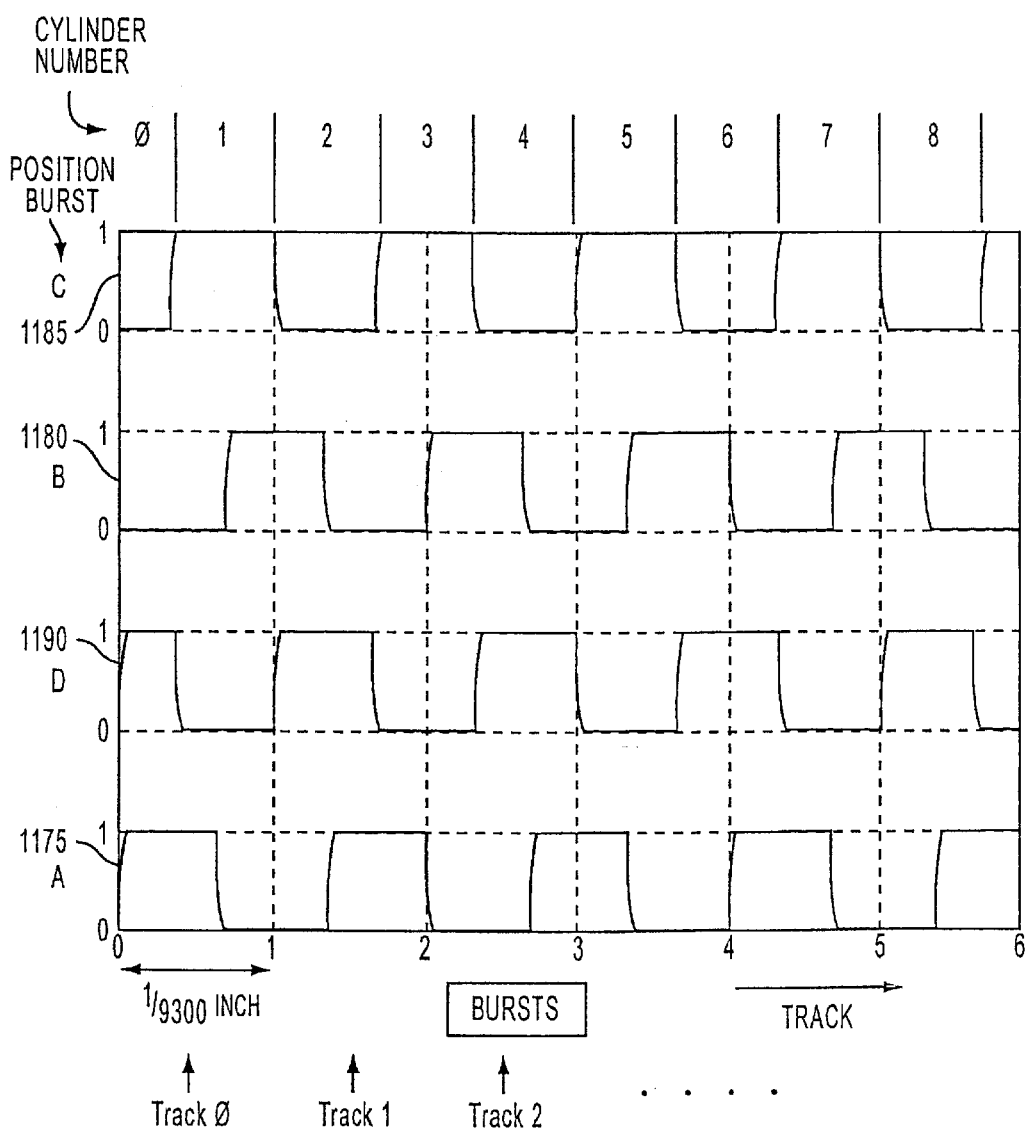
FIG. 9 illustrates a signal diagram of an embodiment of the present invention.

FIG. 9 illustrates a signal diagram of an embodiment of the present invention. FIG. 9 represents position burst data as it is written upon a magnetic disk. FIG. 9 includes traces 1175 for position burst A, trace 1180 for position burst B, trace 1185 for position burst C, and trace 1190 for position burst D. The magnitudes of the position bursts are normalized in this example.

Figure 10:
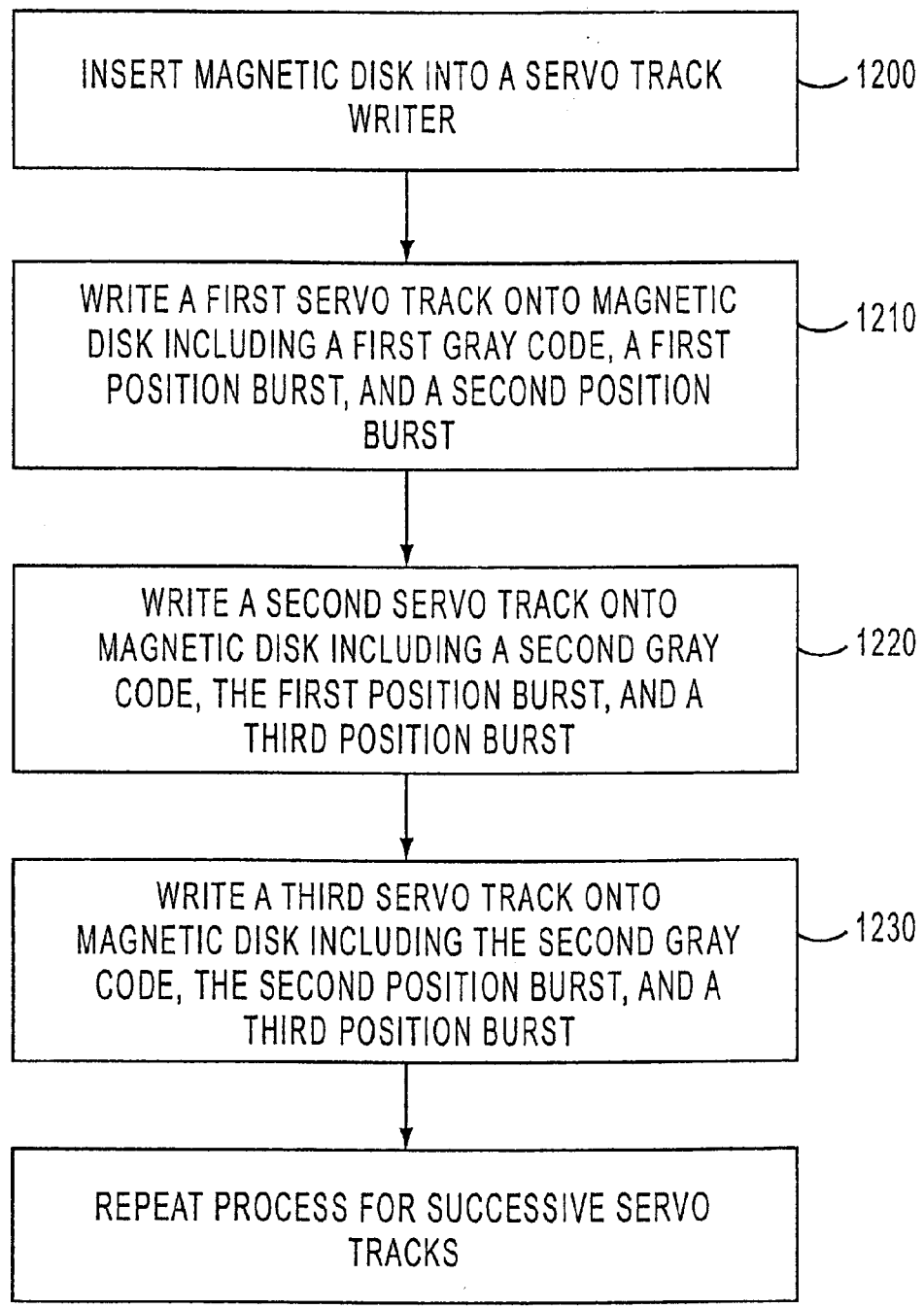
FIG. 10 illustrates a block diagram of a method according to an embodiment of the present invention.

FIG. 10 illustrates a block diagram of a method according to an embodiment of the present invention.

Initially a magnetic disk is inserted into a servo writer, step 1200. Multiple magnetic disks may be combined and inserted into the servo writer in this step as discussed in co pending application Ser. No. 09/321,978 entitled Multiple Magnetic Disk Servo Writing Method and Apparatus, filed on May 28, 1999, attorney docket number 18525-00241005, and assigned to the same assignee. This application is incorporated by reference for all purposes.

Next, a first servo track is written onto the magnetic disk, step 1210. The first servo track typically includes multiple servo burst (90 per track) with each servo burst portion including a first gray code, a first position burst, and a second position burst. In the example in FIG. 8, each servo burst may include the first gray code (with a first cylinder number), an A burst and a D burst respectively. In another example, some servo bursts may include the first gray code (with a portion of the first cylinder number and a portion of the sector number), a B burst and a C burst; and the like.

A second servo track is then written adjacent to the first servo track onto the magnetic disk, step 1220. In the present example, the second servo track includes servo bursts including a second gray code, the first position burst and a third position burst. In the example in FIG. 8, each servo burst may include the second gray code (with a second cylinder number), the A burst and a C burst. In another example, some servo bursts may include the first gray code (with a portion of the first cylinder number and a portion of the sector number), the B burst and a D burst; and the like.

A third servo track is then written adjacent to the second servo track onto the magnetic disk, step 1230. In the present example, the third servo track includes servo bursts including the second gray code, the third position burst and a fourth position burst. In the example in FIG. 8, each servo burst may include the second gray code (with the second cylinder number), the C burst and a B burst. In another example, some servo bursts may include a second gray code (with a portion of a second cylinder number and a portion of the sector number), the D burst and an A burst; and the like.

In the present embodiment, three servo tracks are written for every data track, as illustrated in FIG. 8.

The above process is typically repeated for successive adjacent servo tracks, as illustrated in FIG. 8. For example, a fourth servo track includes a third gray code (the second cylinder number), the fourth position burst (B), and the first position burst (D); a fifth servo track includes a third gray code (the third cylinder number), the first position burst (D), and the second position burst (A); and a sixth servo track includes a fourth gray code (a fourth cylinder number), the second position burst (A), and the third position burst (C).

The designation of first, second, third, etc. servo track is merely for convenience. Such servo tracks may located anywhere on the magnetic disk. For example, the first, second, and third track may refer to servo tracks located near the inner diameter of the magnetic disk or near the outer diameter of the magnetic disk.

Further, the designation of the first, second, third, etc. gray code and cylinder number may also refer to any cylinder on the magnetic disk. For example, the gray code may refer to cylinder numbers (near the middle of the magnetic disk Further, the "first", "second", "third", and "forth" position burst values may be any ordering of the position bursts A, B, C and D in embodiments of the present invention. For example the ordering can be A, D, C, B; D, A, C, B; B, C, D, A; C,B,D,A; B,D,A,C;D,B,A,C; A,C,B,D; C,A,B,D and other similar types of arrangement. Further, the left-to-right ordering of bursts along a servo track may be any other arbitrary ordering than A, B, C, D, for example, C, B, D, A, and the like.

Gray code bursts 1120 preferably change every two servo tracks. In the example in FIG. 8, gray code bursts 1120 are aligned with bursts C and D, however in alternative embodiments of the present invention, gray code bursts 1120 are aligned with bursts A and B.

Figure 11:
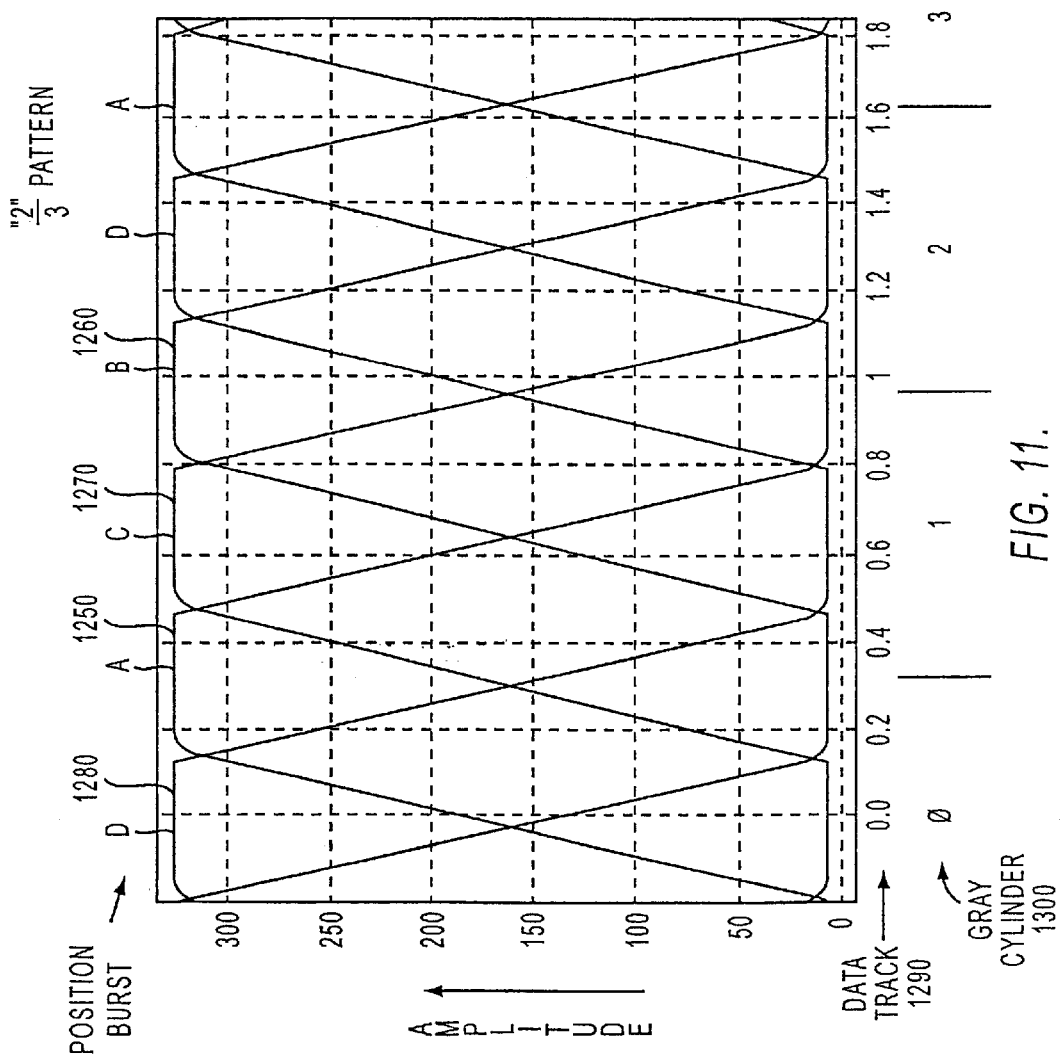
FIG. 11 illustrates a signal strength diagram of an embodiment of the present invention.

FIG. 11 illustrates a signal strength diagram of an embodiment of the present invention. FIG. 11 includes trace 1250 for position burst A, trace 1260 for position burst B, trace 1270 for position burst C and trace 1280 for position burst D These traces represent the amplitude of each position burst as read or sensed by an MR read head versus data track number 1290 using the higher resolution MR read head 910 illustrated in FIG. 7. Also illustrated are sensed gray coded cylinder numbers 1300.

In the present embodiment, the position of the MR read head is determined in response to servo track number 1300 and in response to a combination of the values of the sensed position bursts. In this example, the amplitudes of the traces are arbitrary and other amplitudes are contemplated in alternative embodiments of the present invention.

Figure 12:
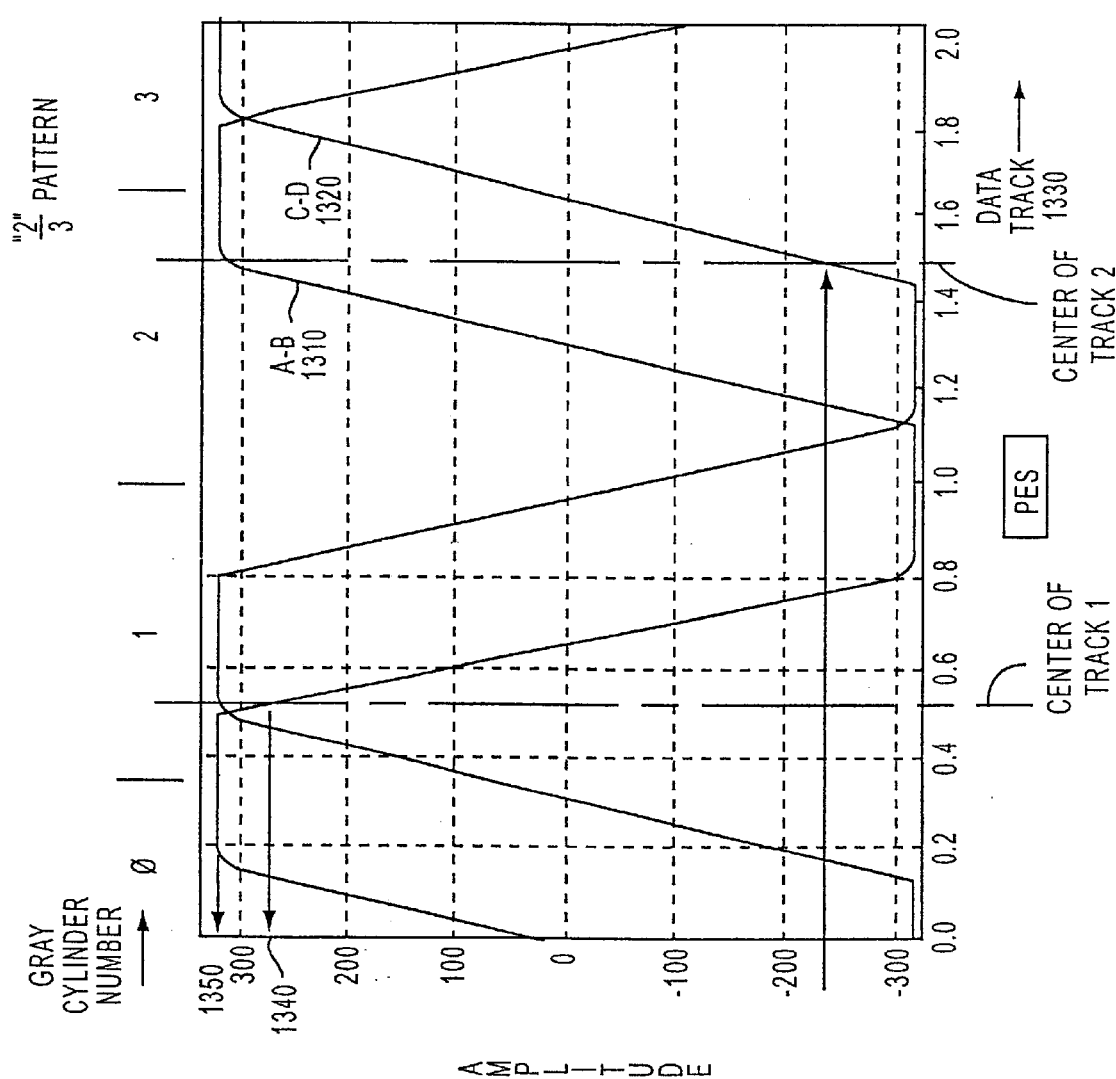
FIG. 12 illustrates a signal diagram of an embodiment of the present invention.

FIG. 12 illustrates another signal strength diagram of an embodiment of the present invention. FIG. 12 includes trace 1310 and trace 1320 versus data track 1330 location.

In this embodiment, trace 1260 is subtracted from trace 1250 to form trace 1310 in FIG. 11 and trace 1280 is also subtracted from trace 1270 to form trace 1320. As can be seen in FIG. 12, at virtually all locations along the magnetic disk, when either trace 1310 or 1320 are at a maximum amplitude or a minimum amplitude, the other trace 1320 or 1310, respectively, has some intermediate amplitude. For example, at approximately the center of track 1, the value of trace 1310 is value 1340, and the value of trace 1320 is the value 1350.

In one embodiment of the present invention, to identify the position of the MR head over the magnetic disk, the approximate position of the MR read head on the magnetic disk is first determined by decoding or reading the cylinder number. For example, when the cylinder number read is 2, the MR head is somewhere on data track 2.

Next, the values of A–B and C–D are determined. Based upon these values, and predefined tables stored typically within a memory, such as control store 710, the position of the MR head within data track 2 is determined.

To locate the MR read head at a particular position on a magnetic disk, the desired values of the cylinder number, A–B and C–D for the particular position are initially determined. Next, the MR read head is then re-positioned so that the desired cylinder number is detected; this is termed coarse positioning. Subsequently, the MR read head is re-positioned so that the desired values for A–B and C–D are detected. As an example, to locate the MR read head at the center of track 2, the MR head is first moved until the cylinder number 2 is detected. Next, the MR read head is adjusted on the data track until A–B has a maximum amplitude, and C–D has an amplitude of approximately −240; this is termed fine positioning. By narrowing the width of the data track width of the gray coded cylinder number to two-thirds the width of a data track, the amount of fine positioning required is lessened.

In alternative embodiments of the present invention, to locate the position of the MR read head over the magnetic disk, the values of A–B and C–D are first determined, and then the value of the cylinder number is determined.

CONCLUSION

In the foregoing specification, the invention has been described with reference to specific exemplary embodiments thereof. Many changes or modifications are readily envisioned. For example, it is envisioned that different combinations of the position bursts and the cylinder number can be used to determine the location of an MR head above a magnetic disk. In other examples, a greater or lesser number of position bursts can be combined with the cylinder number to determine the position of the MR head.

The presently claimed inventions may also be applied to other areas of technology such as mass storage systems for storage of video data, audio data, textual data, program data, or any computer readable data in any reproducible format.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A removable magnetic cartridge providing enhanced data storage capacity comprising:
   a rigid casing; and
   a magnetic disk disposed within the rigid casing, comprising:
      a top surface for storage of data; and
      a bottom surface for storage of data, the bottom surface comprising a plurality of data tracks, at least one data track from the plurality of data tracks comprising a first servo track, a second servo track, and a third servo track, the first servo track having a portion including a first gray code, a first position burst, and a second position burst, the second servo track having a portion including a second gray code, the second position burst, and a third position burst, and the third servo track having a portion including the second gray code, the third position burst and a fourth position burst.

2. The removable magnetic cartridge of claim 1 wherein the bottom surface of the magnetic disk further comprises another data track from the plurality of data tracks adjacent to the one data track comprising a fourth servo track, a fifth servo track, and a sixth servo track, the fourth servo track having a portion including a third gray code, the first position burst, and the fourth position burst, the fifth servo track having a portion including the third gray code, the first position burst, and the second position burst, and the sixth servo track having a portion including a fourth gray code, the second position burst and the third position burst.

3. The removable magnetic cartridge of claim 1 wherein the first gray code comprises only a portion of a cylinder number.

4. The removable magnetic cartridge of claim 1 wherein the first gray code comprises only a portion of a cylinder number and a portion of a sector number.

5. The removable magnetic cartridge of claim 1 wherein the first servo track also includes a portion including a third gray code,
   wherein the first gray code comprises a cylinder number, and
   wherein the third gray code comprises a portion of the cylinder number and at least a portion of a sector number.

6. The removable magnetic cartridge of claim 1 wherein a width of the first servo track is approximately one-third a width of the at least one data track.

7. The removable magnetic cartridge of claim 6 wherein a width of the second servo track is approximately one-third the width of the at least one data track.

8. The removable magnetic cartridge of claim 1 wherein the second position burst is not adjacent to the third position burst on the second servo track.

9. A method for formatting a magnetic disk for a removable magnetic cartridge comprising the steps of:
   providing the magnetic disk having a top surface and a bottom surface;
   writing a first servo track onto the top surface, the first servo track having a portion including a first gray code, a first position burst, and a second position burst;

writing a second servo track onto the top surface adjacent to the first servo track, the second servo track having a portion including a second gray code, the second position burst, and a third position burst; and writing a third servo track onto the top surface adjacent to the second servo track, the third servo track having a portion including the second gray code, the third position burst and a fourth position burst, wherein a first data track comprises the first servo track, the second servo track and the third servo track.

10. The method of claim 6 further comprising the steps of:

writing a fourth servo track onto the top surface adjacent to the third servo track, the fourth servo track having a portion including a third gray code, a first position burst and a fourth position burst;

writing a fifth servo track onto the top surface adjacent to the fourth servo track, the fifth servo track having a portion including the third gray code, the first position burst, and a second position burst; and writing a sixth servo track onto the top surface adjacent to the fifth servo track, the sixth servo track having a portion including a fourth gray code, the second position burst and the third position burst, wherein a second data track comprises the fourth servo track, the fifth servo track and the sixth servo track.

11. The method of claim 9 wherein the first gray code comprises only a portion of a cylinder number.

12. The method of claim 9 wherein the first gray code comprises only a portion of a cylinder number and a portion of a sector number.

13. The method of claim 9 wherein the first servo track also includes a portion including a third gray code, wherein the first gray code comprises a cylinder number, and wherein the third gray code comprises a portion of the cylinder number and at least a portion of a sector number.

14. The method of claim 9 wherein the first position burst is not adjacent to the second position burst on the first servo track.

15. The method of claim 9 wherein the third position burst is not adjacent to the fourth position burst on the third servo track.

16. The method of claim 9 wherein a width of the first servo track is less than half a width of the first data track.

17. A computer system having a removable drive unit, the removable drive unit comprising:

a magnetic disk including a first servo track having a portion including a first gray code, a first position burst, and a second position burst, a second servo track having a portion including a second gray code, the second position burst, and a third position burst, and a third servo track having a portion including the second gray code, the third position burst and a fourth position burst;

a sensor coupled to the magnetic disk for reading data values for the first gray code, for the second gray code, for the first position burst, for the second position burst, for the third position burst, and for the fourth position burst;

a memory coupled to the sensor for storing the data values for the first gray code, for the second gray code, for the first position burst, for the second position burst, for the third position burst, and for the fourth position burst; and a processor coupled to the memory for determining a position of the sensor relative to the magnetic disk in response to the data values for the first position burst, for the second position burst, for the third position burst, and for the fourth position burst, and for determining a position of the sensor relative to a data track on the magnetic disk in response to the data values for the first gray code and for the second gray code, and to the position of the sensor relative to the magnetic disk.

18. The computer system of claim 17 the first servo track also includes a portion including a third gray code, wherein the first gray code comprises a cylinder number, and wherein the third gray code comprises a portion of the cylinder number and at least a portion of a sector number.

19. The computer system of claim 17 wherein the first gray code comprises only a portion of a cylinder number.

20. The computer system of claim 17 wherein the first gray code comprises only a portion of a cylinder number and a portion of a sector number.

21. The computer system of claim 17 wherein the second position burst is not adjacent to the third position burst on the first servo track.

22. The computer system of claim 17 wherein the third position burst is not adjacent to the fourth position burst on the third servo track.

23. The computer system of claim 17 further comprising a write head coupled to the processor, the write head configured to write data to the magnetic disk in response to the position of the sensor relative to the data track.

24. The computer system of claim 17 wherein a width of the write head is greater than a width of the sensor.

* * * * *